United States Patent
Godec et al.

(10) Patent No.: US 7,264,737 B2
(45) Date of Patent: Sep. 4, 2007

(54) CONTROL OF WATER TREATMENT SYSTEM WITH LOW LEVEL BORON DETECTION

(75) Inventors: Richard D. Godec, Longmont, CO (US); Robert J. Ritz, Phoenix, AZ (US); William W. Carson, Hopkinton, MA (US); Thomas J. Susa, Ludlow, MA (US)

(73) Assignee: Ionics, Incorporated, Watertown, MA (US)

(*) Notice: Subject to any disclaimer, the term of this patent is extended or adjusted under 35 U.S.C. 154(b) by 614 days.

(21) Appl. No.: 10/491,773

(22) PCT Filed: Oct. 7, 2002

(86) PCT No.: PCT/US02/31645

§ 371 (c)(1),
(2), (4) Date: Aug. 5, 2004

(87) PCT Pub. No.: WO03/031034

PCT Pub. Date: Apr. 17, 2003

(65) Prior Publication Data

US 2004/0245175 A1    Dec. 9, 2004

Related U.S. Application Data

(60) Provisional application No. 60/348,400, filed on Oct. 26, 2001, provisional application No. 60/327,666, filed on Oct. 5, 2001.

(51) Int. Cl.
*B01D 61/12* (2006.01)
*C02F 1/44* (2006.01)
*C02F 1/58* (2006.01)

(52) U.S. Cl. .................. 210/739; 210/96.2; 210/143
(58) Field of Classification Search ............... 210/900, 210/96.1, 96.2, 739, 143, 649, 650, 651, 210/321.6
See application file for complete search history.

(56) References Cited

U.S. PATENT DOCUMENTS

| 5,833,846 | A | 11/1998 | Tanabe |
| 5,997,745 | A | 12/1999 | Tonelli |
| 6,420,185 | B1 | 7/2002 | Carr |

FOREIGN PATENT DOCUMENTS

| JP | 10-080684 | 3/1998 |
| JP | 2001-129365 | 5/2001 |

*Primary Examiner*—Terry K. Cecil
(74) *Attorney, Agent, or Firm*—David Silverstein; Andover-IP-Law

(57) ABSTRACT

A water treatment system and method including a membrane-based boron removal unit includes a boron analyzer for detecting the concentration of boron in a treatment stream. The boron removal unit can be a reverse osmosis (RO) or electrodeionization (EDI) treatment unit. A controller responds to the detected boron concentration to control an operation of the RO or EDI units. In an EDI system, the controller may adjust current or voltage supplied to match current to changes in ionic load and maintain a portion of the dilute cell in a substantially regenerated state. In an RO system, the controller may control the high pressure side flow rate, the brine blowdown rate, the product water permeation rate, pH, or feed rate of chemicals in response to the detected boron concentration value.

23 Claims, 3 Drawing Sheets

CONTROL OF WATER TREATMENT SYSTEM WITH LOW LEVEL BORON DETECTION

This application claims the benefit of U.S. provisional applications Nos. 60/327,666, filed Oct. 5, 2001 and 60/348,400, filed Oct. 26, 2001.

FIELD OF THE INVENTION

The present invention relates generally to methods and apparatus for controlling and/or regulating operation of water treatment systems to enhance or optimize treatment, wherein the treatment system removes boron. It relates more particularly to water treatment or ultrapure water (UPW) treatment systems employing an arrangement of various water treatment units that include one or more reverse osmosis (RO) treatment units, or to systems that include one or more filled cell electrodialysis (EDI) units. In broad terms, such control is effected by sampling the liquid being treated, providing a sample or a sample stream to a boron analyzer, and applying the detected boron level to set an operating parameter or processing condition of an RO or EDI unit so as to enhance the treatment or removal process. Sampling may be performed either before, within or after such EDI or RO unit, and in some embodiments is performed at a product outlet, such as a primary make-up line outlet in a semiconductor plant, using a low-level on-line boron detector.

BACKGROUND OF THE INVENTION

It has become increasingly important to be able to detect, measure and remove very low concentrations of contaminants in deionized water with a high degree effectiveness and reproducibility of results. For municipal water supplies, certain maximum contaminant levels (e.g., 500 ppb for boron) must not be exceeded, while for certain industrial applications, such as semiconductor manufacture, levels below about 100 ppt are desirable. This is because even very low levels of boron present in the deionized UPW product water used in manufacturing can significantly and adversely affect the quality and performance of a semiconductor chip.

Large amounts of ultrapure water are required in processes to manufacture semiconductors, and boron may be present as a contaminant in the raw or pretreated feed water. If present, it must be removed to very low concentration, for the following reason. Boron is a p-type semiconductor dopant used in manufacture of solid state electronics, and it functions as a principal charge carrier in the doped silicon crystal. The presence of boron even at a sub ppb level in a fab plant process fluid, such as developer, cleaning fluid, vapor, rinse water or the like can give rise to surface deposits of boron, which in turn, may become incorporated in a silicon substrate during various process stages—particularly heating or ion implantation stages, and may change the intended dopant profile or otherwise alter the electrical characteristics of the substrate. To prevent the inadvertent introduction of boron contamination during manufacturing processes, it is necessary to remove boron from the fab plant UPW stream down to a very low residual level, typically to a low threshold under 50 ppt, and preferably below 10-20 ppt.

Several general facts about the sources of and levels of boron present in natural waters, and its passage in treated waters, affect the ability of a treatment plant to dependably or economically achieve a product level below a set level. Boron may be present in local water sources at levels of about 50 ppb to several ppm (or more for sea water), so it is sometimes necessary when treating bulk water to carry out specific steps to remove boron to a desired level. One level, in order to meet drinking water specifications, may be between 50-500 ppb; this may require a 10- to 100-fold reduction for a seawater reverse osmosis plant. Another level, suitable for certain agricultural applications (where particular crops may require a ceiling) is several hundred ppb, and this target may be set for a plant treating municipal waste, agricultural run-off or brackish groundwater, among other sources.

Several water treatment technologies achieve some reduction of boron, and may be applied to meet such standards. These include reverse osmosis, various complexing agents followed by filtration, as well as boron selective resins and other treatment approaches. Water treatment plants typically involve a pretreatment stage followed by a sequence of other processes, possibly with return loops and bleed or blow-down exit points, bypasses and/or blending to meet diverse competing goals of water recovery, economy, and safe waste disposal.

A UPW treatment plant for semiconductor fabrication processes must generally demineralize the feed water down to a residual boron concentration in the product in the low parts per trillion, the precise level often being specified for expedience by the boron detection limit of the instrumentation available at the plant. Such a level shall for simplicity be referred to herein simply as "boron free".

Boron is generally present in water in a form that is poorly ionized at middle pH, and when relying on a reverse osmosis (RO) treatment, about 50-70% of the starting boron level may be expected to pass in the permeate. Much greater removal is possible by raising the pH substantially, e.g., to about pH 11, and cuts of 98-99% may be achieved with RO when the ionic load and membrane characteristics permit an RO unit to be operated in this condition.

Ion exchange is of limited effect. Because boron is poorly captured and is loosely held, it may be said that ion exchange doesn't really stop boron passage, it just slows it down. Generally, boron is poorly ionized at neutral pH, and is poorly captured and is weakly held by ion exchange resins. While it may be effectively captured by fully regenerated resin, it may be eluted by other elements (including OH from the equilibrium dissociation of water) as ionic load in the exchange bed increases. Boron ions are therefore the first ions to leak from the mixed ion exchange resin beds that follow RO or that in some areas constitute a principal pretreatment. Leakage can occur as the resin becomes exhausted, and will also occur (in the case of boron) in pulses or spikes much earlier, as bleeding due to displacement by an influx of competing ions, or due to a change in temperature, pH or the like.

System design must therefore address the dependable and effective removal of boron to a predetermined level despite the relatively wide range of possible starting concentrations and competing minerals, the seasonal or episodic changes in source quality and composition, and the relatively variable rates of boron removal or retention using standard water treatment processes.

An illustration is instructive. S. Malhotra et al. have reported in "Correlation of Boron Breakthrough versus Resistivity and Dissolved Silica in RO/DI System" (Ultrapure Water, May/June 1996. 13(4): p. 22-26) that boron was the first ion to break through the ion exchange resin beds of a water treatment system when they switched to using thin-film-composite (TFC) membranes in their reverse osmosis (RO) units. The introduction of TFC reverse osmosis (RO) membranes (to replace cellulose acetate RO membranes) was very effective in reducing the silica passage through the RO apparatus, but the reduction in boron passage was not as great. This led to quicker boron saturation of the ion exchange beds and the observation of unexpected boron breakthrough in a mixed ion exchange resin bed. More generally, once boron has accumulated in an ion exchange bed, changes or upsets in operating conditions may lead to boron release at unacceptable levels. For example, an increase in temperature may result in release of the captured boron (apparently displaced by the higher levels of thermally dissociated hydroxyl ions); similarly, an increase in the level of one or more other dissolved components in the feed water may displace some of the captured boron, potentially eluting higher concentrations of boron than were present in the feed. Thus, standard ion exchange resins are ill-adapted to producing boron-free water.

Adsorption of borate ion on anion exchange resin or selective boron capture resin is the most common method to for producing boron free water. Several systems incorporating this approach have been described in the patent literature, such as those described in U.S. Pat. Nos. 5,811,012 and 5,833,846 of M. Tanabe et al. Those patents show boron-specific ion exchange resin downstream of a degasifier and upstream of a final mixed resin bed, and the patentee reports boron measurements by ICP-MS of below 10 ppt (apparently its limit of detection). One well-known boron-specific exchange resin that may be used in such applications is Amberlite IRA-743T, manufactured by Rohm and Haas Company. Capture resins are widely used at various stages in other treatment systems to meet a required level.

However, boron-specific removal resins generally shed organic carbon, and for semiconductor applications they must therefore be situated upstream of other removal processes. To minimize expense, such treatment may be implemented on a smaller scale in a treatment branch process to supply water only for the specific fab processes where boron affects product quality. However, these resins, like other exchange resins, necessarily require the use of hazardous chemicals to regenerate the resins, so their use raises certain environmental or safety (as well as related cost) concerns. Moreover, capture resins cost several times as much as other exchange resins (e.g., about $500-700 dollars per cubic foot).

When the product water must meet a predetermined maximum contaminant level (MCL) or threshold, particularly when the threshold is very low or the feed is variable, system design may be difficult or present only costly solutions. It is possible that boron removal at higher levels may be enhanced by certain operating protocols with an RO treatment unit that would allow a downstream process, such as a polishing loop with virgin ion exchange resin or a primary makeup loop with ion exchange bottles or capture resin, to effectively remove residual boron (and other material) to sub ppb levels with a reasonable resin lifetime between replacements or regeneration. However, identifying treatment conditions or configurations of treatment units that will have such high levels of removal and operate stably to produce product water below a predetermined threshold, or to produce UPW fab water with boron at a low ppt level, remains a problem. Use of such systems when chip production valued at tens of thousands of dollars per hour are at risk may appear to require substantial verification of the process, or fail safe operating protocols before gaining acceptance in the industry. For systems meeting a higher, less stringent, threshold, the above-described properties still make dependable modeling difficult.

Thus, there remains a need for systems and methods that operate to continuously and effectively produce UPW product water having a boron level below a predetermined level.

There is also a need for water treatment methods and systems to produce UPW water for semiconductor manufacture and other applications, which remove boron down to very low levels without the use of hazardous chemicals.

In addition there is a need for systems and methods to detect change or upset in a UPW treatment unit, and which control a treatment unit or its operating environment to maintain quality of the feed water.

Accordingly, a principal object of this invention is to provide methods and apparatus for water treatment, wherein the treatment system has a boron output below a predetermined maximum level and employs at least one RO treatment unit and/or filled cell ED/EDI unit.

It is a general object of this invention to provide methods and apparatus for water treatment in semiconductor manufacturing or other application which require accurate, reliable removal of boron to a low concentration, e.g., below a predetermined threshold that is between 0 and 500 ppb boron, wherein the system effects a boron detection or measurement, and applies such measurement to control or regulate a condition of operation of a filled cell electrodialysis stack, an RO unit or a related flow treatment or flow conditioning unit.

It is also an object of this invention to control a treatment system in accordance with a boron detection and measurement device, applying a boron level measurement to regulate the electrical current or voltage supplied to a filled cell electrodialysis stack and/or system.

As applied to an RO system, an object of this invention is to provide methods and apparatus for controlling an operating condition of an RO unit in accordance with a system by sampling water with a boron detection/measurement device and applying the measurement to regulate the operating condition of an RO unit.

Other objects and advantages of the present invention will in part be obvious and will in part appear hereinafter. The invention accordingly comprises, but is not limited to, the methods and related apparatus, involving the several steps and the various components, and the relation and order of one or more such steps and components with respect to each of the others, as exemplified by the following description and the accompanying drawings.

SUMMARY OF THE INVENTION

The invention is generally directed to methods and apparatus for water treatment producing boron free water or water that meets a predetermined boron removal threshold. Systems of the invention include a fluid treatment line including one or more reverse osmosis or filled cell electrodialysis (electrodeionization or EDI) units, and employ a boron analyzer for detecting concentration of boron at a point in the treatment line. The detected level is applied to set a condition of operation. In the case of treatment systems with an ED/EDI unit, this may be accomplished by setting electrical current or voltage supplied to one or more EDI units (stacks), or changing a condition such as pH of fluid entering that portion of the system, as a function of the detected boron level. A control system responsive to the detection level may control the stack to increase its boron removal rate by raising the applied current or voltage when the boron concentration is greater than a desired value, or may decrease the current or voltage when the boron concentration is less than a desired value. In this way such stacks or systems can be operated to treat liquids to a predetermined boron concentration without the attention of a human operator and without wasting excessive electrical current or voltage supplied to such stacks or systems. The control system may alternatively apply the detected boron level to identify functionally related changes in resin state or feedwater ionic load, and may change operating parameters to assure steady state output water quality or to correct an upset condition or deleterious operating condition. Other control steps initiated in response to such detection may include initiation of electrical reversal with associated swapping of concentrate and dilute flows, initiation of a chemical cleaning (CIP) cycle, or the like. The methods of the invention may also be used to control boron concentration at any point within a stack or within the system at which control of boron concentration is desired, based on boron detection in a sample supplied to the boron analyzer from that point in the system.

For example, the boron reading from a sample collection tube placed at a midpoint of the flow path through an electrodeionization stack may be applied to control the stack operating potential such that the anion resin along the distal end (e.g., the distal half or two-thirds) of the fluid flow path through the stack remains in a substantially regenerated state. This permits optimal electrical efficiency of removal of the major ionic load of anions, such as chloride, $CO_2$, $SO_4$, $NO_3$ and other readily-ionized minerals, in the proximal end of the dilute cells. It also assures that the distal end is in a highly effective boron removal state. Other sample points may be employed, alone or as a group. Thus, in a stack or treatment system that has more than one stage, the sample supplied to the boron analyzer may be taken from a point between stages, while in treatment systems having an ultraviolet (UV) light source between stages, the sample supplied to the boron analyzer may be from a point upstream or downstream of such UV light source. When the system includes a stack that has electrodes segmented along the length of the liquid flow path, the signal from the analyzer may be applied by the controller to regulate the applied voltage, or the current flowing through different portions of the stack, so as to optimize overall demineralization of the feed flow consistent with a given boron threshold, or may be applied to maximize the removal of boron by assuring that a suitable portion of the flow path remains in a state effective to remove boron down to the target level.

In systems with multiple sample points, samples may be supplied to a valve system which is configurable to supply the sample from any particular sample outlet to the boron analyzer. Correspondingly, the control system may be programmed to respond to the given detection, optionally in conjunction with a conductivity or other measurement, by regulating the electrical current or voltage of the respective stack or stage from which the sample was supplied, or a related upstream or downstream unit. The valve system and the control system may be manual or automatic. The valve system may consist of multiple valves, a single multiport valve, or a number of multiport valves.

In reversing stacks, that is where the electrical polarity is reversed and the diluting stream compartment becomes the concentrating stream compartment, the control system may regulate the current or voltage supplied, or may initiate a reversal sequence or initiate a chemical cleaning cycle based on the output from the boron analyzer over time.

The sample may be supplied to the boron analyzer from a point along the length of a product manifold within a stack. By varying the position of the sample point along the length of the product (dilute out) manifold the performance of any cell in the stack can be determined. After the position of the point along the length of a product manifold that has the highest boron concentration has been determined, that point may continue to be used as a control point, providing a sample supply to the boron analyzer during continued operation of the stack.

Embodiments of the invention may include treatment systems with one or more reverse osmosis units, and vary a condition of RO operation in response to a boron measurement. In a UPW treatment system of the invention having one or more RO units, the outlet fluid may be sampled to a boron detector, and the control system may then apply the boron measurement to regulate RO operation so as to optimize the removal of boron. This is accomplished by one or more steps of setting the high pressure side flow rate to the RO unit, setting or adjusting the brine blowdown rate, and/or by setting the feed rate of one or more chemicals in the RO system. The control system can, for example, increase high pressure side flow rate, brine blowdown rate, increase product water permeation rate, and/or feed rate of chemicals when the boron concentration is greater than a desired value. It can also or it can decrease high pressure side flow rate, brine blowdown rate, decrease product water permeation rate, and/or feed rate of chemicals in the event boron concentration is less than the preset value and processing conditions may be relaxed or use of chemicals decreased while still maintaining effective levels of removal in the RO or a downstream portion of the system. In this way, an RO stage or system can be operated to treat liquids to a predetermined boron concentration without the attention of a human operator and without wasting chemicals supplied to such stage or system. This method and apparatus may also be used to control the boron concentration at any RO stage or point in the treatment system by supplying the sample stream to the boron analyzer from the point in the system at which control of the boron concentration is desired and effecting appropriate adjustments in that or another stage. In a stage or system having more than one pass, the sample supplied to the boron analyzer may be from a point between passes. In a stage or system having an ultraviolet (UV) light source between passes, the sample supplied to the boron analyzer may be from a point upstream or downstream of the UV light source. Multiple sample outlets may communicate with a valve system operative to supply the sample from any particular sample outlet to the boron analyzer such that the control system can regulate more than one, or different ones of, the foregoing states or conditions in response to boron values at different places along the treatment line.

DETAILED DESCRIPTION OF PREFERRED EMBODIMENTS

Figure 1A:
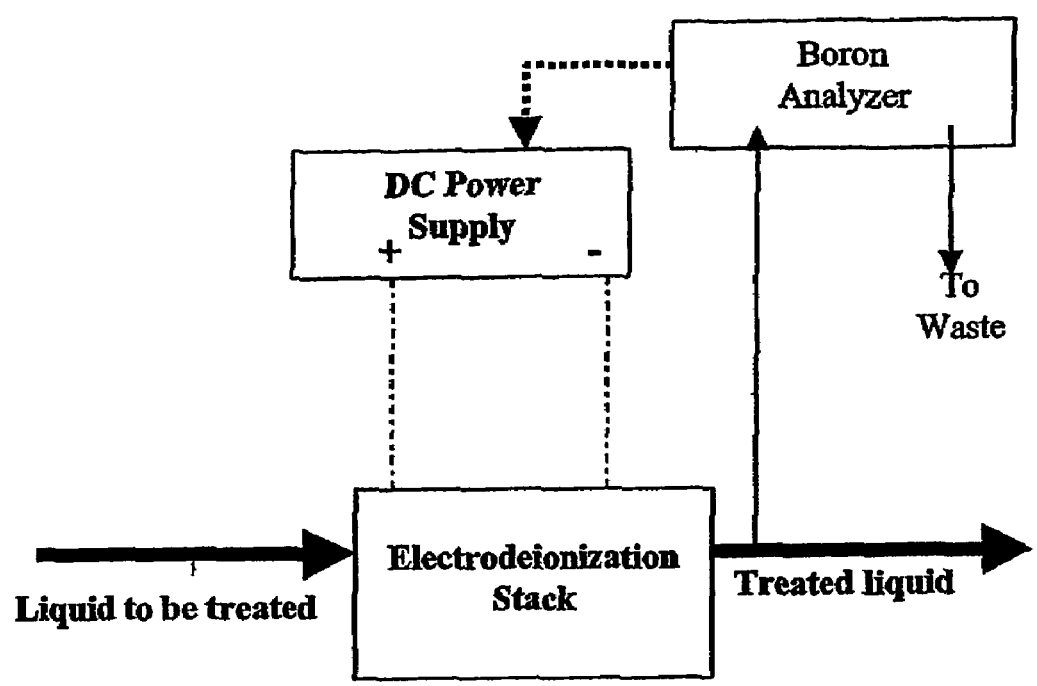
FIG. 1A is a simplified process flow diagram of a treatment system of the present invention having an EDI stage or unit.

The present invention provides UPW treatment methods and apparatus with control of filled cell EDI stacks (FIG. 1A) and/or RO units (FIGS. 1B, 2) based on or in response to a boron detection or measurement. The construction and operation of a low level boron detector suitable for real-time, rapid, inexpensive on-line measurement of boron in ultra-pure water used for example to manufacture semiconductor electronic circuitry is described in International Patent Application PCT/US01/24637. This instrument is a convenient (and less costly) measurement instrument than the conventional ICP-MS instrument used for low-level boron measurement, and it may be attached on-line to monitor boron levels and confirm water quality of a boron at the low ppt level to confirm boron free operation of a water treatment system. Other instrumentation can be used to sample higher levels of boron, or sample boron in the presence of other ions, and may be used to detect boron concentration at earlier stages of a treatment line. This invention applies such measurements to control one or more membrane-type boron removal units in a process line, where the term "membrane-type unit" is intended to refer to a unit such as an EDI water treatment unit that relies on semipermeable membranes exchange media with electrical operation, or to a filtration type unit such as an RO unit that relies on selectively permeable membranes without requiring an electrical field or current. The controller may control a condition of water supplied to electrodeioization or reverse osmosis unit to assure that boron is removed to below a predetermined concentration, which, in various embodiments is a level in part per billion, or sub ppb, and in fab plants results in a product water that is boron-free, typically in the low parts per trillion. Desirable operating states and internal flow conditions of a filled cell electrodialysis stack and/or system are described in International Patent Application PCI/US01/25226, filed Aug. 10, 2001 and commonly owned with the present invention. Such background knowledge of the typical details of stack operation and the removal rates and types of ions removed at different regions along the flow path through an EDI stack will be assumed herein. Each of the foregoing international patent applications is hereby incorporated herein by reference in its entirety.

In one aspect, the present invention includes a system wherein a boron measurement is applied to a control system that regulates the electrical drive of an EDI stack to maintain effective boron removal conditions within the stack. In another aspect, a control system may regulate operating conditions of an RO system to maintain the desired boron set point. Systems of the invention may set operating conditions of an RO or EDI unit to achieve one threshold in a first stage, and adjust conditions of a later stage to meet another, lower, level based on boron measurements. Systems may also be vary the interface with an existing treatment plant, effecting a control operation such as varying the blend of feed from a high pH silica removal treatment stage to most efficiently meet the desired RO feed state condition.

In general, the attainment of a very low boron level may require that the starting water to the final boron removal units itself have a limited boron load that is attained by earlier treatment stages starting with a feed or source water of higher and potentially variable boron content greatly above this limit. For example, a groundwater or seawater raw feed may have 0.2-5 ppm boron, while a feed to a final boron removal stage may have a concentration of 0.5-5 ppb boron. In each case, the feed may be treated by suitable early stage processes, such as ion exchange beds, boron-specific chelating beds, multiple pass RO treatment, or other treatment to bring boron level of the source down to a first predetermined threshold or suitable range. In embodiments discussed below, it will therefore be assumed that the starting water has a limited boron level, although it may include other minerals at higher concentrations. The invention then applies a boron measurement to control an electrodeionization stack and/or reverse osmosis unit to produce or maintain defined preselected boron limit, or varies the blend of permeates from different RO units to meet a predetermined level of boron, in the product water. Embodiments of the invention may be followed by further treatment, such as a final polish loop in a fab plant. In that case, the resin bottles of the final polish will have a greatly extended life before breakthrough.

In one embodiment of the invention shown in FIG. 1A, a sample stream of the product from one or more filled cell electrodialysis stack(s) is directed, e.g., by a conduit, to the inlet of an on-line boron analyzer. The electronic output of the boron analyzer is sent to a control system that adjusts the electrical current or voltage supplied to the filled cell electrodialysis stack(s) and/or system(s). Other possible control steps or adjustments includes setting a temperature of water supplied to the EDI unit to enhance boron removal.

Within the stack, the fluid being treated flows through dilute cells containing ion exchange resin, typically in bead form, and the beads capture various ionic species that then migrate, under the influence of an applied electric potential, through ion-permeable membranes out of the treatment stream. The invention may assume a model wherein, in a single stage EDI, calcium, chloride and other easily removed ions are preferentially removed at the front or proximal portion of the fluid path along the length of the EDI dilutes cells, and the stack is run at a current level such that the exchange resin filling toward the distal end of the fluid path remains in a substantially regenerated state. Boron, although not ionized at neutral pH, is effectively captured if it contacts regenerated resin in the OH form. Once captured by the exchange resin, the boron migrates into an adjacent concentrate channel and is flushed, so the EDI unit can effectively remove 95% or more of the boron from the feed provided a sufficient length of the distal flow path remains regenerated. Thus, to optimize boron removal by EDI, the controller may respond to detection of increased or increasing boron in the EDI product water by increasing the drive current to the stack, causing the upstream species (chloride and the like) to be entirely removed earlier along the proximal flow path. This assures that the distal end of the flow path will be in a substantially regenerated form, and will more effectively capture and remove boron from the flow. Similarly, if the boron level falls below a desired set point, or will remain below the desired set point, the controller may operate by decreasing the EDI drive current, allowing the major front-end ionic burden to be removed at lower electrical flux. When boron removal still remains effective, operation at lower flux may be desirable to save power. The controller may, in the alternative apply the detector output to adjust or control another element, such as chemical injection upstream of the EDI unit to adjust feed pH, changing the pH to enhance front-end ion removal, distal end resin regeneration state, or boron ionization. One advantageous pH control method is applied to an EDI stack having primarily or only anion exchange resin in an initial front end portion of its dilute cells; cations producing elevated pH then remain in the flow to enhance boron removal.

In another embodiment a sample stream of the feed of a filled cell electrodialysis stack(s) is conditioned by flowing through one or more ion exchange columns capable of removing ions more highly charged than boron, but not boron itself, and is then provided to an on-line boron analyzer. Alternatively, suitable conditioning may be performed using a nanofiltration or reverse osmosis membrane to reject strongly charged ions while having an insignificant rejection of boron. The output of the boron analyzer is used as an input to a control system that adjusts the electrical current or voltage supplied to the filled cell electrodialysis stack(s) and/or system(s), or controls a chemical addition or other condition as described.

Systems of the invention may include several stacks in hydraulic series. In this case, preferably a sample stream is taken from a sample tap in the liquid conduit between the stacks and directed to the boron analyzer. The boron analyzer output is provided as an input to a control system that adjusts the electrical current or voltage supplied to one or both series-connected stack(s). The first stack may, for example, be controlled to effectively remove the major ionic burden, while the second stage may be operated in a substantially regenerated mode to assure the highest boron removal. Separate or different-conductivity concentrate streams may be provided to each stack to optimize their operation, and other modifications of the stacks such as layered, monotype or other resin fillings may be used as appropriate for their respective feed characteristics and desired steady state operating conditions. A system may employ a first stack built with only anion resin to allow maintenance of elevated pH of the stream for effective boron removal, and the second stack may have a mixed resin filling to remove other ions.

When an electrodeionization stack has its electrodes segmented along their length parallel to the liquid flow path through the cells of the stack, the boron reading of the product stream may be applied to separately control the current of each electrode segment, so as to optimize removal of boron in the stack as a whole. The segmented electrodes allow one to separately control the rates at which the ions passing in different regions are removed, without introducing excessive polarization or water splitting in other regions that might cause the resin to throw salt or otherwise degrade the product stream.

In systems with two or more stacks in hydraulic series having an ultraviolet (UV) light source between the stacks, a sample stream may be directed to the boron analyzer from a sample tap in the liquid conduit downstream of the UV light source. The output of the boron analyzer is used as an input to a control system that adjusts the electrical current or voltage supplied to one or more of the stacks.

In systems with multiple stacks and/or stages of ED, EDI and/or RO units, a preferred embodiment has multiple sample outlets connected to inlets of a valve system with a single outlet that delivers a sample stream to the inlet of an on-line boron analyzer. Valve control signals or related synchronization signals allow the states and boron levels of each sampled stage to be identified, and the output of the boron analyzer may thus be applied by the control system to control different ones of the units as appropriate to achieve a boron free product. For example, the controller may regulate electrical current or voltage supplied respectively to appropriate ones of the stacks and/or stages from which the sample was supplied, to adjust RO parameters at an upstream stage, or to select from among possible changes based on secondary (non-boron) considerations, such as cleaning treatment or chemical addition costs, trade-offs in passage of other ions or the like. The valve system may include multiple valves, a single multiport valve, or multiple multiport valves, and the valve system and related control system may be manual or automatic in operation. If manual, preferably the control system includes a display in which system states control interventions are displayed for the operator.

When the treatment system is one configured for filled cell electrodialysis reversal (EDIR) operation, that is, when electrical polarity of an EDI unit is reversed and the diluting stream compartment becomes the concentrating stream compartment, then preferably the sample point for boron detection is placed in the product outlet line. In this case, the controller may apply the analyzer output to initiate a reversal sequence, or may determine suitable reversal intervals for periodic reversal based on the output from the boron analyzer over time. One particularly advantageous mode of operation is to employ a multi-stage EDI treatment, with reversal of only the first stage.

In another aspects of operation, the sample stream may be taken with a movable probe having an inlet movable to different positions along the length of a product manifold of an EDI stack. By varying the point at which said liquid conduit inlet is placed along the length of the product manifold, the performance of any diluting cell in the stack can be determined. After the position of the point along the length of a product manifold that has the highest boron concentration has been determined, that point may continue to be used as the sample supply to the boron analyzer during continued operation of the stack.

Figure 1B:
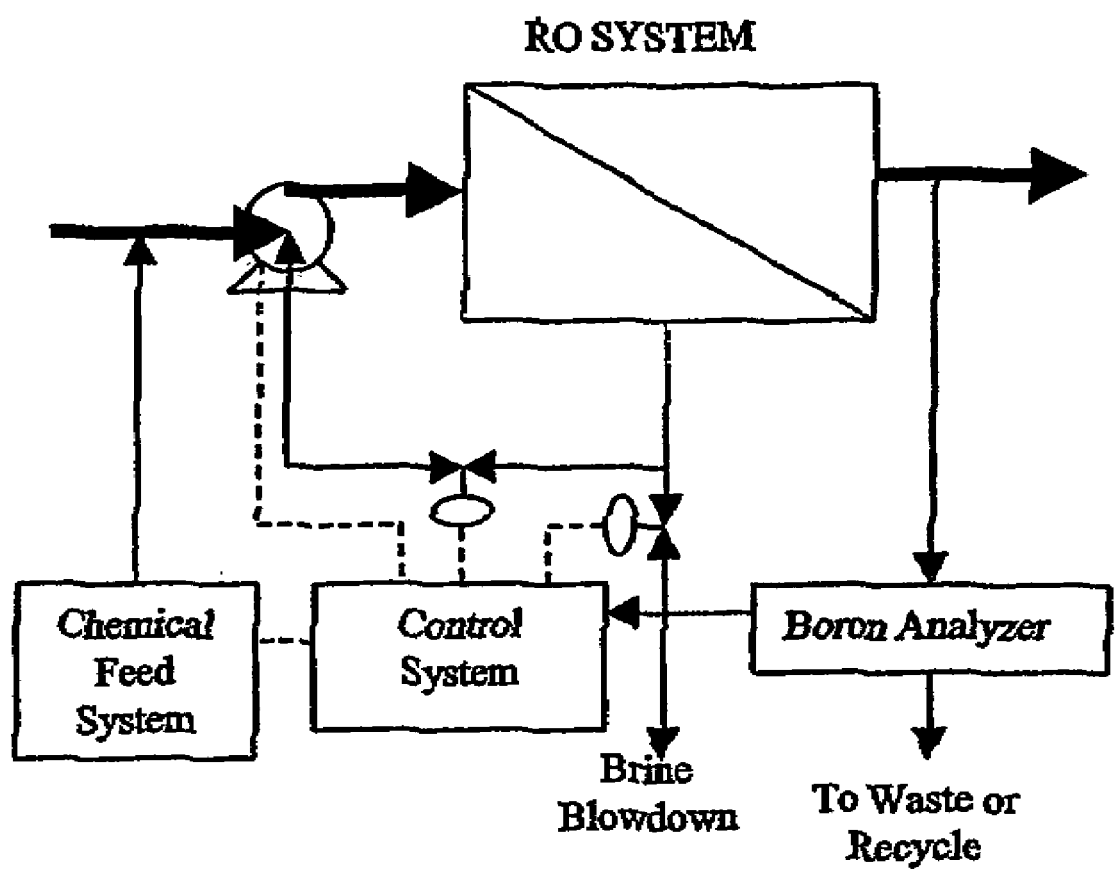
FIG. 1B is a simplified process flow diagram of a treatment system of the present invention having an RO stage.

Systems of the invention may also sample and control treatment plants employing one or more reverse osmosis units for production of water meeting a preselected boron level (MCL), as shown in FIG. 1B. In this case, the control system is configured to change one or more operating conditions of the RO unit. For example, it may control a pump motor, back-pressure or outlet valve, chemical injector or other element, and may receive inputs from appropriate pressure sensor, conductivity, pH, chemical addition or other sensors, such that the controller regulates high pressure side flow rate, brine blowdown rate, and/or feed rate of chemicals in one or more RO stages or units of the treatment system in response to the level of boron measurement. The preferred type of boron analyzer for boron free product sensing is that described in the aforesaid international PCT patent application PCI/US01/24637, incorporated in this application in its entirety. Such instrument is commercially available from Sievers Instruments, Inc. of Boulder Colo., as the UPW Boron Analyzer, an on-line boron analyzer designed for continuous measurement of ultra-trace boron contamination, which provides continuous, unattended measurement of boron in ultrapure water down to 20 parts per trillion. Other measurement devices may be used for detection of less stringent upstream boron measurement levels.

As relevant to the task of boron removal, operation of a reverse osmosis unit with increased high pressure side flow rate decreases the thickness of the fluid/membrane polarization or boundary layer, and reduces the concentration of boron next to the layer of the RO membrane effecting the separation. Increasing the brine blowdown from the high pressure side of the process decreases the total boron concentration on the high pressure side of the membrane, while increasing the product water permeation rate produces a product water with a lower boron concentration. Chemicals such as polyols (i.e. sorbitol), polymeric entities with polyols or other boron sequestering active sites, or caustic may be added at controlled rates to the RO system feed, or to the feed of a second or third pass RO system, to increase the rejection of boron and/or its complexes by the RO membrane. Additives or chemical agents may be partially recycled by adding an ultrafiltration loop, and blow down may be controlled to maintain effective operation with efficient use of chemicals. The methods and systems embodying methods according to this aspect of the invention perform one or more of these control interventions in response to the detected boron level.

In one preferred embodiment a sample stream of the product from RO stages and/or system(s) is directed to the inlet of a low level boron analyzer, e.g., an on-line boron analyzer, which communicates with a control system that adjusts one or more of the high pressure side flow rate, brine blowdown rate, and/or feed rate of chemicals in one or more RO units of a treatment system.

In another embodiment, a sample stream of the feed to RO stages and/or system(s) is passed through one or more ion exchange columns capable of removing ions more highly charged than boron, but not boron itself, and this conditioned stream is passed to the boron analyzer. Alternatively, sample conditioning of the feed may be performed by using a nanofiltration or a reverse osmosis membrane to reject (remove) strongly charged ions while having a well-characterized but incomplete rejection of boron. Such sample preparation may be done for only certain sampling points and not others, as appropriate for the particular feed and the various treatment units upstream of each sampling point. Preferably, such conditioning is effected when interfering chemical species occur at high concentrations in the sample feed to the boron analyzer. Other suitable conditioning treatments may include specific adsorption or absorption, addition of specific complexing or sequestering agents, simple dilution, and/or application of standard dilution and/or standard addition (such as done before RO to characterize operation).

In systems with two or more RO units and/or stages in hydraulic series, a sample stream from a sample position in the liquid conduit between stages is preferably directed to the boron analyzer, and the detection output is applied by a control system as described above to adjust high pressure side flow rate, brine blowdown rate, and/or feed rates of chemicals (or blow down rate of recycled chemicals) in one or more RO units or stages of the system. When a UV process is applied between two RO stages and/or two passes in hydraulic series, a sample stream may be taken from a sample tap in the liquid conduit downstream of the UV light source, and its boron level used to control one or more operating parameters of RO units in the system. It should be noted that when using a polyol-based boron capture resin or chemistry, a UV unit at a disinfecting wavelength or band, such as a 254 nm UV, is preferably used to control biogrowth. When the system has multiple passes and/or stages, a preferred embodiment provides multiple sample outlets to a valve system having a single outlet communicating directly with the inlet of an on-line boron analyzer, or having a single outlet communicating with the inlet of an on-line boron analyzer and one or more outlets that provide fluid samples to sample conditioning processes as described above connecting with the analyzer.

As for the EDI system embodiments, the valve system may include multiple valves, a single multiport valve, or multiple multiport valves, and the valve system and/or the control system may be manual or automatic. A sample stream may also be supplied to the inlet of a boron analyzer from inlets, or a probe having a movable inlet positionable along the length of a product manifold of several RO modules. By varying the point at which the sample inlet is placed along the length of the RO product manifold the performance of any module in an RO stage or system is then determined. After the position of the point along the length of a product manifold that has the highest boron concentration has been determined, that point may continue to be used as the sample supply point for the boron analyzer during continued operation. For example, RO modules may be contained in a number of pressure vessels having their product outlets connected to a common manifold for any particular stage. One end of a small diameter tube or pipe may be inserted in the manifold by a means that allows controlled positioning of the inlet of the tube or pipe at a point that corresponds to the position in said manifold of the product outlet of any of the module(s) of the RO pressure vessel, and the outlet of the tube pr pipe is connected to the boron analyzer. Similarly, the probe may be positioned in the manifold of an array of vessels, to sample the outputs of the individual vessels, each of which typically houses a string of four to eight modules. In this manner a representative sample stream, or a "worst case" sample stream, or the stream from any particular branch of the manifold can be directed to the boron analyzer, directly or by way of a preconditioning process.

In one embodiment of a system, a source of water to be treated is passed through a gross filter to strain the water and remove larger particulates, a microfiltration or ultrafiltration membrane or unit, a softener to remove hardness, and optionally a degassing unit, and the pH of the feed is increased (for example, by adding caustic or other alkaline liquid, or by other suitable technique), and passed to the high pressure side of a reverse osmosis system. A sample stream from the permeate side of the RO membrane is supplied to an on-line boron analyzer which provides a signal corresponding to the concentration of boron in the sample stream to a control system which regulates the means used to increase the pH of the feed to the RO (for example by regulating the rate at which caustic or other alkaline liquid is supplied to the feed), increasing the feed (or polyol capture material) if needed to maintain concentration of boron below a predetermined low level. For example, for UPW fab water, the control system may maintain boron below 50 ppt, advantageously below 20 ppt and preferably below about 10 ppt. Similarly, for potable water, the system may maintain a 50 ppb level, 30 ppb or such level as may be specified. For operation of a fab plant UPW system, the system may control an RO stage to produce a low- or sub ppb boron level output, followed by an EDI stage or loop operated to produce low ppt or boron-free product water. The EDI loop may include UV, ion exchange polishers or other treatment of a conventional type. Even without special resins in the EDI unit, removal rates above 95% are readily maintained, resulting in a removal efficacy such that, if followed by a conventional final polish, a greatly extended bottle life of 5-10 years is expected.

Figure 2:
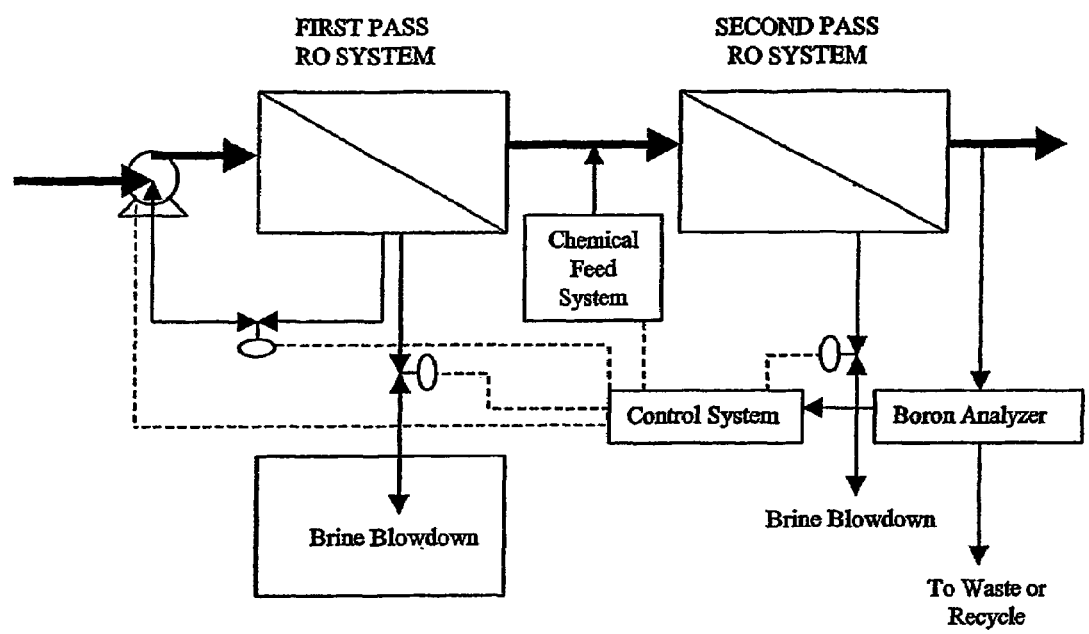
FIG. 2 is a simplified process flow diagram of another RO embodiment of the present invention.

In an embodiment as illustrated in FIG. 2, a sample stream is supplied from the product outlet of a two-pass RO system with interstage caustic injection. The on-line boron analyzer provides a signal corresponding to the concentration of boron in the sample stream to a control system that regulates the rate of caustic supplied to the feed to the second RO pass, and the caustic feed rate is increased as the boron concentration rises above a predetermined value, and may be decreased as the boron concentration falls below a lower predetermined value. Rather than injecting caustic, the RO feed may come from a previous stage or be integrated into a system, where a high pH has already been achieved. In this case the controller may set a blend rate, or inject a lesser amount of caustic, to obtain the desired decrease or increase of pH. Rather than controlling pH, the RO stage removal may be effected using an agent, such as a boron absorbing polyol, a capture agent immobilized in suitably compatible porous polymer phase, microbeads or other system injected into the feed. Its rate of injection, or removal, or effective residence time may be set or controlled based on detected boron level. In this case, the agent captures boron while in the stream, is rejected by the RO; the RO reject may be further passed to a UF unit to separate the injected capture agent and recirculate it to the RO feed, enhancing residence time and overall boron removal.

One treatment system having the described low boron controlled output may advantageously be implemented by arranging that an existing treatment plant feed its product or intermediate stage product water to one or more EDI and/or RO units arranged and controlled as described above. For example, the treatment systems of the present invention may receive water from a final or intermediate stage of treatment line as described in U.S. Pat. No. 5,925,255 or published international patent application PCT/US97/14239 (the so-called "HERO" process). In such cases, the controlled units may receive a feed that has already been controlled to a high or low pH, and the system may be configured to operate for effective boron removal with little or no additional chemical costs.

It will be apparent to those skilled in the art that changes, additions and subtractions may be made in the above-described apparatus and methods for detection and treatment with boron removal, without departing from the scope of the invention herein, and it is intended that all matter contained in the above description shall be interpreted in an illustrative and not a limiting sense. Various modifications of and variations on the method and apparatus as herein described will be apparent to those skilled in the art, and all such modifications and variations are considered within the scope of the invention, as limited only by the claims appended hereto and equivalents thereof.

What is claimed is:

1. Apparatus for treating water or other solvent to produce a product having a predetermined maximum level of boron, such apparatus comprising:
   (a) a treatment line including plural treatment units;
   (b) wherein the treatment line includes at least one membrane-type boron removal unit connected for receiving a feed stream of said water or other solvent and providing a treated product stream, the membrane-type boron removal unit being a unit selected from among the set of units including a filled cell electrodialysis (EDI) unit and a membrane filtration unit;
   (c) a sampling outlet providing a sample of said water or other solvent treated by the treatment line;
   (d) a boron analyzer;
   (e) said boron analyzer arranged to provide an output indication of concentration of boron in the sample; and
   (f) a controller, the controller applying said indication of boron to set an operating condition of the membrane-type boron removal unit such that product water of the treatment line meets a predetermined maximum level of boron;
   further wherein the membrane-type boron removal unit includes an EDI unit and the controller sets an electrical drive condition of the EDI unit.

2. A method for controlling removal of boron from water or other solvent to produce a portion having a predetermined maximum concentration of boron in a range of about 500 parts per billion down to about 10 parts per trillion or less, such method comprising the steps of:
   (a) providing a treatment line that includes plural treatment units, wherein the treatment line includes at least one membrane-type boron removal unit connected for receiving a feed stream of said water or other solvent and providing a treated product stream, the membrane-type boron removal unit being a unit selected from among the set of units including a filled cell electrodialysis (EDI) unit and a membrane filtration unit;
   (b) obtaining a sample of said water or other solvent from a point along said treatment line by means of one or more sampling outlets of said treatment line;
   (c) providing said sample to a boron analyzer capable of determining on-line and monitoring in real time the concentration of boron in said sample when the boron level is in a range from above about 500 parts per billion down to at least about 10 parts per trillion or less, wherein said boron analyzer is arranged to provide a real-time output indication of concentration of boron in the sample; and,
   (d) setting a system parameter or an operating condition of the membrane-type boron removal unit in response to the real-time monitoring of the concentration of boron in said sample such that the method produces a portion that meets said predetermined maximum level of boron according to the following steps:
      (1) when the membrane-type boron removal unit is an EDI system, a controller responsive to boron indication adjusts current or voltage supplied, or changes a feed condition such as pH of the feed stream, or changes other operating parameters, to achieve said predetermined maximum level of boron; and,
      (2) when the membrane-type boron removal unit is a reverse osmosis (RO) system, a controller responsive to boron indication controls one or more of the steps of controlling the high pressure side flow rate, or setting or adjusting the brine blowdown rate, the product water permeation rate, pH, or feed rate of one or more chemicals in the RO system, or changes a feed condition, to achieve said predetermined maximum concentration of boron.

3. A method of producing a substantially boron free UPW product water suitable for semiconductor fabrication, wherein the method includes the steps of
   providing a treatment line including at least one membrane-type water treatment unit selected from among an electrodeionization (EDI) unit and a reverse osmosis (RO) unit,
   detecting a low level boron concentration on line from one or more sampling points along the treatment line, and
   dynamically controlling an operating condition of the membrane-type water treatment unit in response to said detecting so as to produce said substantially boron free product water;
   wherein the step of controlling operating condition includes adjusting potential or current across an EDI stack to substantially remove ions of a type other than boron so as to substantially suppress displacement of boron by said ions of a type other than boron during treatment.

4. System for treating water or other solvent to produce a portion having a predetermined maximum concentration of boron in a range of about 500 parts per billion down to about 10 parts per trillion or less, such system comprising:
- (a) a treatment line including plural treatment units, wherein the treatment line includes at least one membrane-type boron removal unit connected for receiving a feed stream of said water or other solvent and providing a treated product stream, the membrane-type boron removal unit being a unit selected from among the set of units including a filled cell electrodialysis (EDI) unit and a membrane filtration unit;
- (b) at least a sampling outlet providing a sample of said water or other solvent from a point along said treatment line;
- (c) a boron analyzer capable of determining on-line and monitoring in real time the concentration of boron in said sample when the boron concentration is in a range from above about 500 parts per billion down to at least about 10 parts per trillion or less, wherein said boron analyzer is arranged to provide a real-time output indication of concentration of boron in the sample; and,
- (d) a controller in communication with one or more system control units, the controller applying said indication of boron to set a system parameter or an operating condition of the membrane-type boron removal unit such that the system produces a portion that meets said predetermined maximum concentration of boron; further wherein, when the membrane-type boron removal unit is an EDI system, the controller responsive to boron indication is capable of adjusting current or voltage supplied, or changing a feed condition such as pH of the feed stream, or changing other operating parameters, to achieve said predetermined maximum level of boron; and, when the membrane-type boron removal unit is a reverse osmosis (RO) system, the controller responsive to boron indication is capable of one or more of the steps of controlling the high pressure side flow rate, or of setting or adjusting the brine blowdown rate, the product water permeation rate, pH, or feed rate of one or more chemicals in the RO system, or changing a feed condition, to achieve said predetermined maximum concentration of boron.

5. The system of claim 4, wherein the membrane-type boron removal unit includes an EDI unit and the controller sets a feed condition of said water or other solvent provided to the EDI unit.

6. The system of claim 4, wherein the membrane-type boron removal unit includes an RO unit and the controller sets an operating condition of the unit or a condition of feed provided to the unit effective to achieve the predetermined maximum level of boron.

7. The system of claim 6, further comprising a treatment stage effecting boron capture ahead of the RO unit, and the controller controls said treatment stage to achieve the predetermined maximum boron level.

8. The system of claim 4, comprising a first stage comprising RO and a second stage comprising EDI, and wherein the controller sets an operating condition of said first and/or said second stages to achieve one or more predetermined maximum boron levels at one of more stages of the treatment line.

9. The system of claim 4, wherein the treatment line receives a flow of feed from a stage of a treatment system having a non-neutral pH.

10. The system of claim 9, wherein the controller controls a condition selected from among chemical injection and blend ratio to achieve the predetermined maximum boron level.

11. A method of producing a substantially boron free ultrapure water product having a maximum level of boron in the range of about 500 parts per billion down to about 10 parts per trillion or less for semiconductor fabrication or the like, wherein the method includes the steps of:
- (a) providing a treatment line for treating a feed stream that includes at least one membrane-type water treatment unit selected from among an electrodeionization (EDI) unit and a reverse osmosis (RO) unit;
- (b) detecting in real time a low level boron concentration in the range of about 500 parts per billion down to at least about 10 parts per trillion or less on-line from one or more sampling points along the treatment line; and,
- (c) setting a system parameter or an operating condition of the membrane-type water treatment unit in real time response to said detecting of a low level boron concentration so as to produce said substantially boron free ultrapure water product according to the following steps:
  - (1) when the membrane-type boron removal unit is an EDI system, a controller responsive to boron indication adjusts current or voltage supplied, or changes a feed condition such as pH of the feed stream, or changes other operating parameters, to achieve said predetermined maximum level of boron; and,
  - (2) when the membrane-type boron removal unit is a reverse osmosis (RO) system, a controller responsive to boron indication controls one or more of the steps of controlling the high pressure side flow rate, or setting or adjusting the brine blowdown rate, the product water permeation rate, pH, or feed rate of one or more chemicals in the RO system, or changes a feed condition, to achieve said predetermined maximum level of boron.

12. The method of claim 11, wherein the step of controlling operating condition includes adjusting pH to enhance removal of boron or of competing ions.

13. The method of claim 11, wherein the step of controlling operating condition includes adjusting an operating condition of an RO unit to produce said substantially boron free product water.

14. The method of claim 13, wherein the step of controlling an operating condition includes a step selected from among the group of steps consisting of controlling high pressure side flow rate, controlling brine blowdown rate, controlling feed rate or concentration of chemicals, controlling blend rate of RO feed, and controlling pH in one or more RO units of the treatment system.

15. The method of claim 11, wherein the step of detecting a low level boron concentration is performed using an on-line boron detector having low ppt sensitivity.

16. A method of producing a substantially boron free UPW product water suitable for semiconductor fabrication, wherein the method includes the steps of:
- providing a treatment line including at least one membrane-type water treatment unit selected from among an electrodeionization (EDI) unit and a reverse osmosis (RO) unit,
- detecting a low level boron concentration on line from one or more sampling points along the treatment line, and
- dynamically controlling an operating condition of the membrane-type water treatment unit in response to said detecting so as to produce said substantially boron free product water;
- wherein the step of controlling operating condition includes adjusting potential or current across an EDI stack so as to maintain anion exchange resin in a distal portion of the flow path through the EDI stack in a substantially regenerated state for effective boron removal.

17. A method of producing a substantially boron flee UPW product water suitable for semiconductor fabrication, wherein the method includes the steps of:
providing a treatment line including at least one membrane-type water treatment unit selected from among an electrodeionization (EDI) unit and a reverse osmosis (RO) unit,
detecting a low level boron concentration on line from one or more sampling points along the treatment line, and
dynamically controlling an operating condition of the membrane-type water treatment unit in response to said detecting so as to produce said substantially boron free product water; wherein the step of controlling an operating condition includes providing a boron capture agent upstream of the RO unit and recirculating said capture agent in a loop between an RO brine outlet and inlet.

18. The method of claim 17, wherein the loop includes a UF unit for concentrating said capture agent.

19. Apparatus for substantially continuously producing a fluid product stream having a boron concentration equal to or less than a predetermined maximum concentration from a fluid inlet stream having a boron concentration above said maximum concentration, said apparatus comprising:
(a) a fluid inlet;
(b) at least one boron analyzer unit connected on-line in said apparatus to receive a sample of the fluid, said analyzer being capable of providing a real-time measure of actual boron concentration in said sample;
(c) at least one membrane-type boron removal unit connected on-line in said apparatus for receiving a stream of the fluid having a boron concentration above said maximum concentration and for providing a product stream therefrom having a reduced boron concentration, said unit being selected from a set of boron-removal units including filled cell electrodialysis units, membrane filtration units and their equivalents; and,
(d) at least one controller connected on-line in said apparatus and arranged to apply said real-time measure of actual boron concentration to regulate on a real-time basis at least one operating condition of said apparatus whereby said apparatus substantially continuously produces said fluid product stream having a boron concentration equal to or less than said maximum concentration.

20. A method for substantially continuously producing a fluid product stream having a boron concentration equal to or less than a predeterminable maximum concentration from a fluid inlet stream having a boron concentration above said maximum concentration, said method comprising the steps of:
(a) passing the fluid inlet stream into a treatment system, said treatment system comprising at least one membrane-type boron removal unit connected on-line in said system for receiving the fluid inlet stream and for providing a product stream therefrom having a reduced boron concentration, said unit being selected from a set of boron-removal units including filled cell electrodialysis units, membrane filtration units and their equivalents;
(b) passing a sample of the fluid to a boron analyzer unit connected on-line in said treatment system, said boron analyzer unit being arranged to provide a real-time measure of actual boron concentration in said sample; and,
(c) adjusting a treatment system operating parameter on a real-time basis in response to said real-time measure of actual boron concentration in said sample so as to substantially continuously recover from said treatment system said fluid product stream having a boron concentration equal to or less than said predeterminable maximum concentration.

21. A method whereby a fluid sample is withdrawn from a fluid treatment system and provided on-line to a real-time boron analyzer for monitoring boron concentration in said sample in order to regulate one or more fluid treatment system parameters to produce a substantially continuous flow of treated fluid having a very low concentration of boron, said method comprising the steps of:
(a) passing a stream of water or other fluid comprising boron to at least one membrane-type boron removal unit connected on-line in said treatment system;
(b) providing a sample of said water or other fluid on-line and on a real-time basis to said real-time boron analyzer; and,
(c) regulating one or more treatment system parameters using a controller connected on-line in said system and arranged to control one or more operating conditions in said system in response to boron concentration readings from said boron analyzer whereby treated water or other fluid from said system maintains a concentration of boron equal to or less than a predetermined maximum boron concentration.

22. Apparatus for controlling removal of boron from water or other fluid on a real-time basis comprising:
(a) at least one membrane-type module configured to remove boron from said water or other fluid;
(b) a conduit for providing a portion of water or other fluid from such apparatus;
(c) a real-time boron analyzer with inlet for receiving said portion from said conduit,
(d) a signal output from said boron analyzer for at least producing a signal that corresponds on a real-time basis to the analysis of actual concentration of boron in said portion; and,
(e) a controller responsive on a real-time basis to signals from said boron analyzer for adjusting operating parameters of said apparatus on a real-time basis to control the removal of boron.

23. Apparatus for controlling removal of boron from water or other fluid on a real-time basis, said apparatus comprising:
(a) a source of water or other fluid having a boron content;
(b) one or more membrane-type unit operations or equivalents thereof adapted to remove boron from said water or other fluid;
(c) a conduit for providing samples of said water or other fluid from at least one location before, within and/or after said one or more membrane-type unit operations;
(d) a real-time boron analyzer in communication with said conduit for performing real-time analyses of actual boron concentration in said samples; and
(e) output components responsive on a real-time basis to said analyses and adapted to control and/or regulate operating parameters of said apparatus to maintain predeterminable values of actual boron concentration in said at least one location.

* * * * *